United States Patent [19]

Browell

[11] 4,258,357

[45] Mar. 24, 1981

[54] ALARM SIGNALLING SYSTEMS

[75] Inventor: Leslie J. Browell, Liverpool, England

[73] Assignee: Plessey Handel und Investments AG, Zug, Switzerland

[21] Appl. No.: 51,184

[22] Filed: Jun. 22, 1979

[30] Foreign Application Priority Data

Jun. 24, 1978 [GB] United Kingdom ............... 27816/78

[51] Int. Cl.³ ............................................ G08B 25/00
[52] U.S. Cl. .................................... 340/506; 340/517; 340/533; 179/5 R
[58] Field of Search ............... 340/506, 517, 524, 525, 340/533, 534; 179/5 R, 5 S

[56] References Cited

U.S. PATENT DOCUMENTS

| 3,648,268 | 3/1972 | Paull ..................................... 340/506 |
| 3,925,763 | 12/1975 | Wadhwani et al. .................. 340/524 |
| 4,044,351 | 8/1977 | Everson ............................... 340/533 |
| 4,118,700 | 10/1978 | Lenihan ............................... 340/524 |

Primary Examiner—Alvin H. Waring
Attorney, Agent, or Firm—Fleit & Jacobson

[57] ABSTRACT

The invention consists of applying a signalling condition to a telephone subscriber line to prime a common burglar alarm arrangement provided at the telephone exchange, which arrangement is activated by the removal of the signalling condition from the line by, for example, a burglary detection device. The equipment at the telephone exchange automatically identifies the subscriber line when the signalling condition is removed and activates an event recording alarm equipment in a Police or Security central station, giving a print out of the identity of the subscriber whose premises have been entered. The major advantage of the system is that the cutting of the telephone line causes the tripping of the common alarm equipment.

12 Claims, 6 Drawing Figures

ALARM SIGNALLING SYSTEMS

The present invention relates to alarm signalling systems and is more particularly concerned with arrangements which provide for the extension to centralized processing offices of remotely generated cautionary and the like alarm conditions.

Such conditions include intruder and fire alarms for example and may arise at or around premises, structures and other areas which are connected by conventional telephone land lines to public or private telephone exchanges. Such telephone lines provide normal originating and terminating telephone service functions.

The uses of the system to be described are not limited to fire and intruder alarms and typical applications may include any one, or a mixture, of the following incomplete list of possibilities.

(a) Intruder alarms
(b) Panic alarms
(c) Fire alarms
(d) Cashier alarms e.g. banks, garages, stores etc.
(e) Vandal alarms e.g. telephone payphone kiosks, coin machines
(f) Apparatus failure e.g. unmanned telephone exchanges, freezer alarms, cold store alarms, heating alarms, industrial process alarms
(g) Frost, snow and flood warning alerts
(h) Invalid, aged and incapacitated persons in distress alarms
(i) Security watchmens clock arrangements
(j) Lift failure e.g. person trapped For ease of presentation hereafter all the above conditions and the like will be considered as alarm conditions.

At the present time two types of remote monitoring systems are commercially available. Firstly alarm conditions are signalled by expensive equipment arranged to dial the local police station (or similar security monitoring centre's) telephone number and then transmit a recorded announcement relating to the origin of the alarm and its nature; this type of alarm system is generally compromised by intruders, prior to entry, by breaking the telephone line.

Secondly special land lines may be hired from the Telecommunications network operating authority which are monitored for alarm conditions by security monitoring equipment based in for example a security agency. Because special dedicated hired lines are employed the system is expensive and could not be adopted universally due to the excessive line plant which would be required.

It is an aim of the present invention to provide an alarm system which uses the public telephone network, is relatively cheap and cannot be easily compromised.

According to the invention there is provided a remote alarm signalling system comprising: (i) at each protected premises, detector means for detecting the presence of an alarm condition and alarm signalling means responsive to the detector means and connected to a telecommunications line and arranged to apply to the line a characteristic signal when the alarm detector is primed and to remove the characteristic signal from the line when the alarm detector detects the presence of an alarm condition and (ii) at the telecommunications exchange (a) a line condition monitoring arrangement for each line having an alarm signalling means connected to it, the monitoring arrangement being adapted to detect the application and removal of the characteristic signal and (b) a common alarm identification circuit arranged to be taken into use by one of the said line condition monitoring arrangements when that arrangement detects that the characteristic signal has been removed from the line served by that arrangement and the common alarm identification circuit is arranged, when it detects the presence of an alarm condition, to generate coded signals indicative of the identity of the alarm condition for display at an alarm monitoring equipment.

The invention, together with its various features, should be more readily understood from the following description which should be read in conjunction with the accompanying drawings. Of the drawings.

FIG. 5 shows a circuit diagram of the exchange control access circuit whereas

Figure 1:
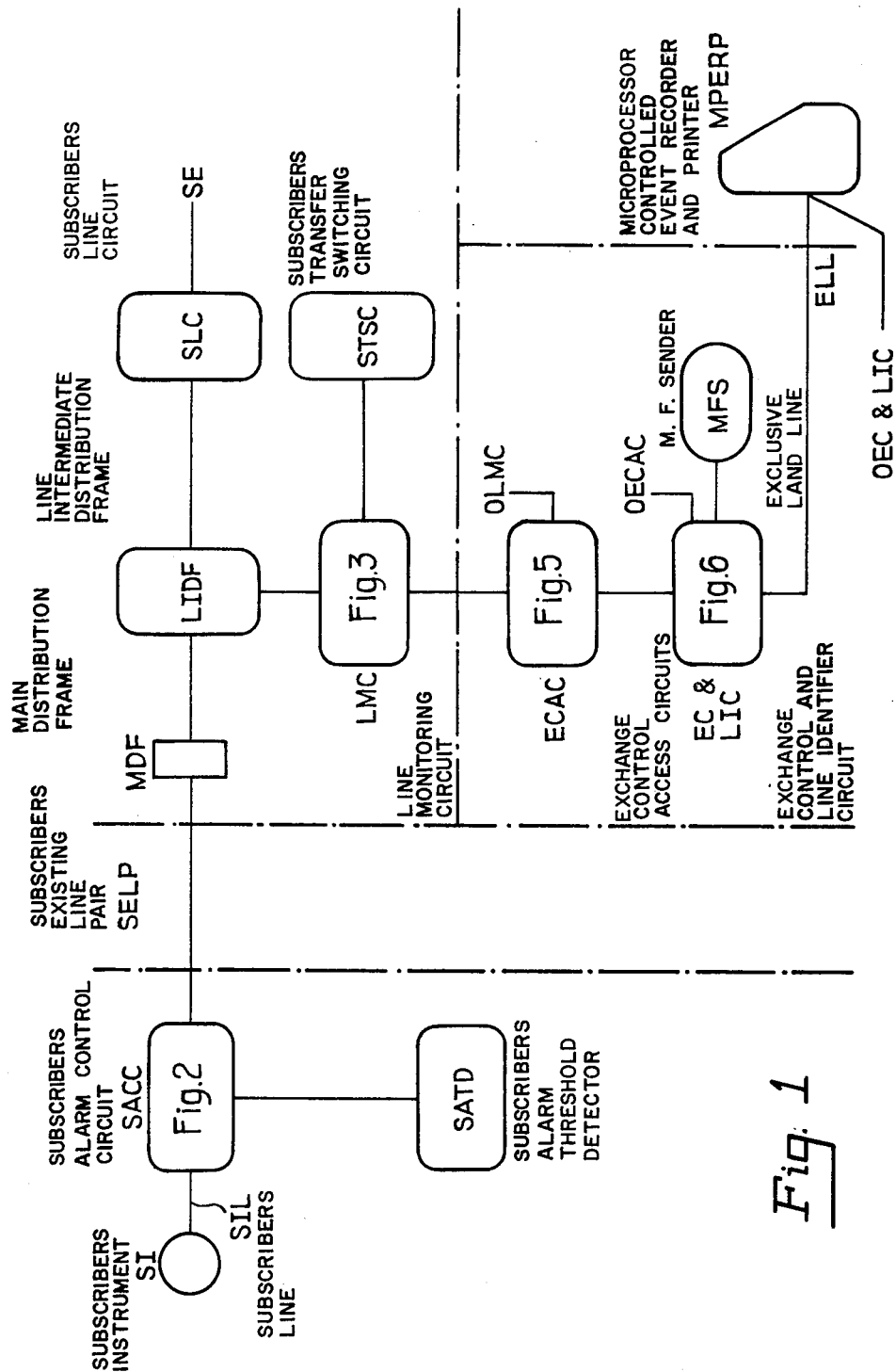
FIG. 1 shows a block diagram of the equipment necessary to achieve one embodiment of the invention.

Referring firstly to FIG. 1 it will be seen that the equipment required to perform the embodiment of the invention comprises a subscribers alarm control circuit SACC, responsive to subscribers alarm threshold detector SATD, and a line monitoring circuit LMC for each subscriber on the exchange having the remote alarm signalling facility, together with the exchange located access circuits ECAC and line identifier circuit EC & LIC and, located externally from the exchange in the premises of a security agency, a microprocessor controlled event recorder and printer MPERP.

Also shown in FIG. 1 are items of equipment provided in the telephone exchange for normal telephone service and these items are included in FIG. 1 so that the point of introduction of the equipment necessary to achieve the embodiment of the invention can readily be discerned. Each line monitoring circuit such as LMC is connected to the existing subscribers line pair SELP at the line intermediate distribution frame LIDF before the subscribers line circuit SLC.

The embodiment chosen for description employs signalling techniques similar to those used by the British Post Office for subscriber controlled transfer facilities in automatic telephone exchanges. The "alarm" is primed in the subscribers alarm control circuit SACC by switching a 33 K ohm resistor across the line SELP to create the characteristic signal. In the exchange line monitor circuit LMC, a transistorised device and allied circuitry is arranged to be sensitive to the potential difference at the point at which it is connected to the line. Accordingly if the potential is of a predetermined value due to the connection of the 33 K ohm resistor an electromechanical relay is operated. Should the telephone line now be cut or short circuited the change condition will cause the relay to release.

The operated state of the relay is detected and this knowledge is retained in the line monitoring circuit LMC so that if the line potential changes, due (a) to say an intruder triggering the alarm threshold detectors SATD thereby causing the 33 K ohm resistor in SACC to be disconnected or (b) the line has been cut or short-circuited feloniously or (c) the controller of the alarm wishing to reset the alarm, the line potential sensitive relay will be released.

With the retained knowledge that the alarm was "primed" and the further effect of the line potential sensitive relay releasing the line monitoring circuit LMC at the exchange causes itself to be exclusively associated with the exchange access circuit ECAC and the circuit EC & LIC.

Upon seizure of the identification circuit LIC a check is made to ensure that the alarm controller is not intent upon resetting the alarm. The monitoring circuitry is made sensitive to the removal of the 33 K ohm resistor in series with a diode, the polarity of which causes the monitoring circuit line-potential-sensitive relay to release when the alarm priming key is also released. Upon association of the identification circuit LIC it offers a similar potentialsensitive relay to the now reversed line. If this latter relay operates it causes the monitoring circuit LMC to be reset; failure to operate causes the identification circuit LIC to generate m.f. coded signals relating to the coded nature of the alarm and the point of origin using the MF sender MFS. These signals are transmitted by exclusive land line ELL to the line event recorder MPERP located in a security agency who provide an alarm monitoring service. Versions of line event recorders are available using a microprocessor and they include signal print-out facilities and have the capability of receiving information from a number of lines simultaneously, 16 lines being a typical figure. Typical of such event recorders is one produced by MITEL under the code number CM8140. Upon receipt of the printed information the controller of the event recorder can inspect the classification and origin identification and take the appropriate action to respond to the alarm condition. Obviously the event recorder may be programmed to provide alarm qualifying information to the controller.

When the exchange line identification circuit LIC has completed the identification it causes the monitoring circuit LMC to be reset and locked-out of action until the reappearance of the alarm priming conditions for again monitoring for an alarm.

During the time that the alarm conditions are set all incoming telecommunications calls to the line still ring out but they are disconnected at the monitoring circuit so as to provide the same conditions to the caller as if the called party was not there to answer, it is however, possible to cause incoming calls to be transferred to another predetermined line automatically using standard call transfer facilities activated from the line monitoring circuit LMC and active on the normal exchange subscribers transfer switching circuit STSC.

Figure 2:
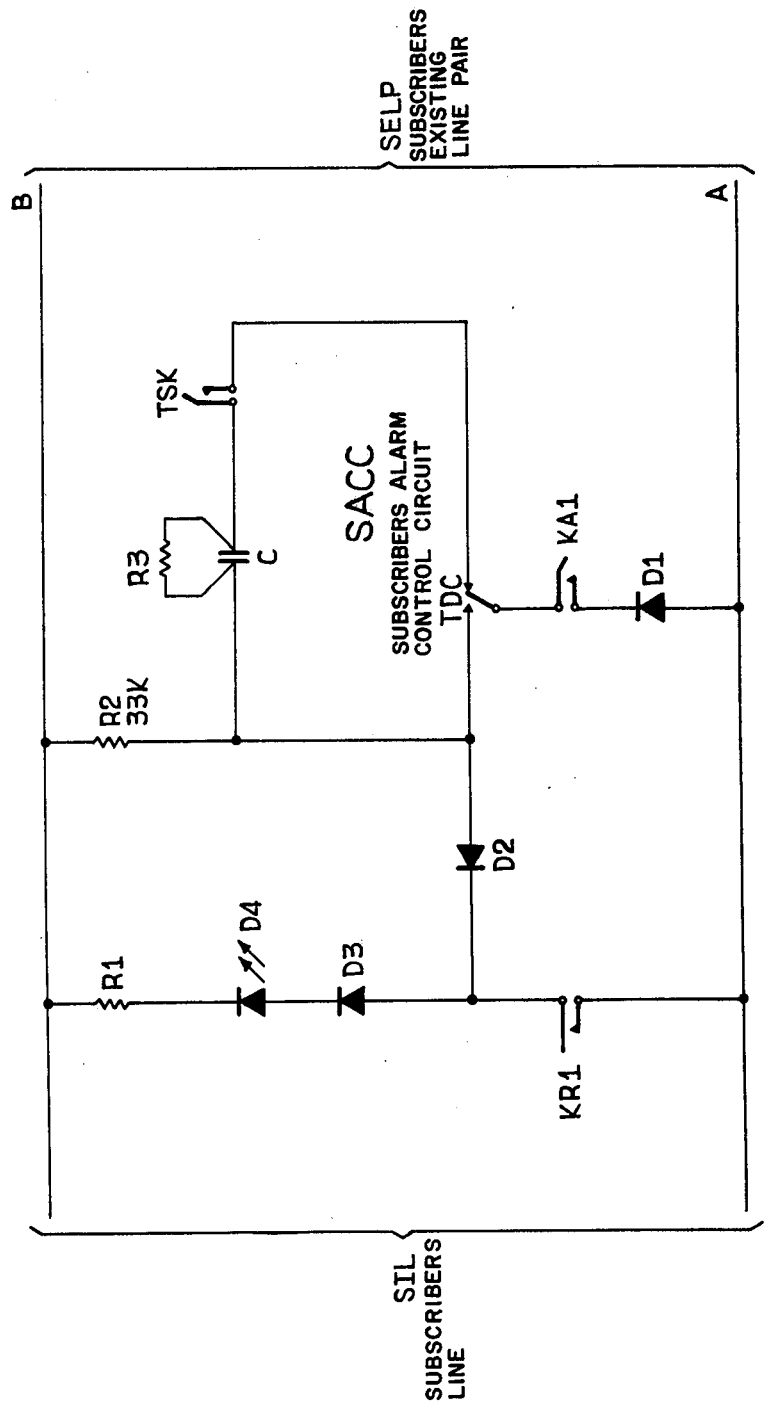
FIG. 2 shows a circuit diagram of the subscribers alarm control circuit.

The subscribers alarm control circuit SACC is shown in detail in FIG. 2. To prime the alarm it is necessary to set the alarm key KA1 thereby applying the polarised 33 K ohm resistor R2 condition across the subs line pair SELP when the threshold detector contacts TDC are set. The 33 K ohm condition is polarised by diode D1 and it prevents alarm reset conditions if the line is broken momentarily.

When the alarm is primed the 33 K ohm resistance condition will be applied across the line pair until either (a) the threshold detector contacts TDC are restored (by the activation of the alarm threshold detector) or (b) the primed alarm requires resetting. The relaxation of the alarm threshold detector contacts TDC removes the 33 K ohm condition from the line pair which will be sensed in the exchange as an "alarm trip" whereas the operation of the reset key KR1 connects the 33 K ohm resistor across the line in series with diode D2 thereby allowing the set key KA1 to be restored without tripping the alarm monitor in the exchange. Diode D4 is a light emitting diode (LED) and is used to indicate to the subscriber when the detector has been removed from the line in the line monitor LMC as it will glow when the line is restored to the telephonic normal state until the reset key is restored. Diode D3 is provided to protect the light emitting diode against excessive reverse bias and resistor R1 is used to limit the current in diode D4. The circuit arrangement involving key TSK and resistor R3 and capacitor C allows telephone service to be provided while the alarm is primed. R3/C cause a defined period of application of the 33 K ohm to the line which of course will be effective only when the handset is on the rest.

Figure 3:
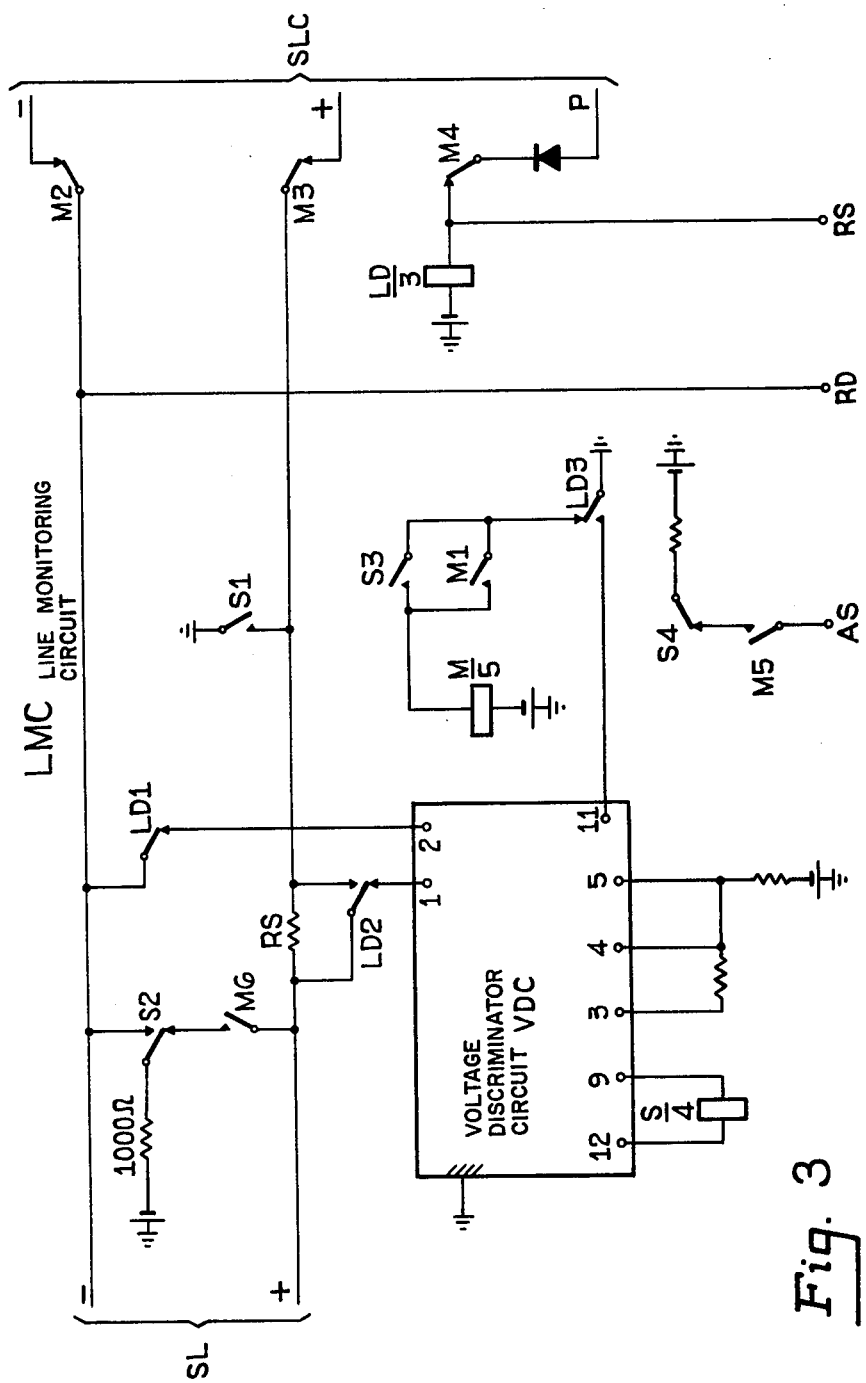
FIG. 3 shows a circuit diagram of the line monitoring circuit.

THe various line conditions applied by the subscribers alarm control circuit SACC are sensed in the line monitoring circuit which is shown in detail in FIG. 3. The subscribers line monitoring circuit LMC is connected into the subscribers line between the main distribution frame MDF and the subscribers line circuit SLC in the exchange using the line intermediate distribution frame LIDF. The line monitoring circuit comprises a voltage discriminator VDC used to detect the application of an alarm priming signal to the line and three relays S, M and LD. The S relay is used to indicate that the voltage discriminator circuit VDC has detected an alarm priming signal, the M relay is used as a priming condition memory whereas the LD relay is used to lock-out the line monitoring circuit LMC.

Figure 4:
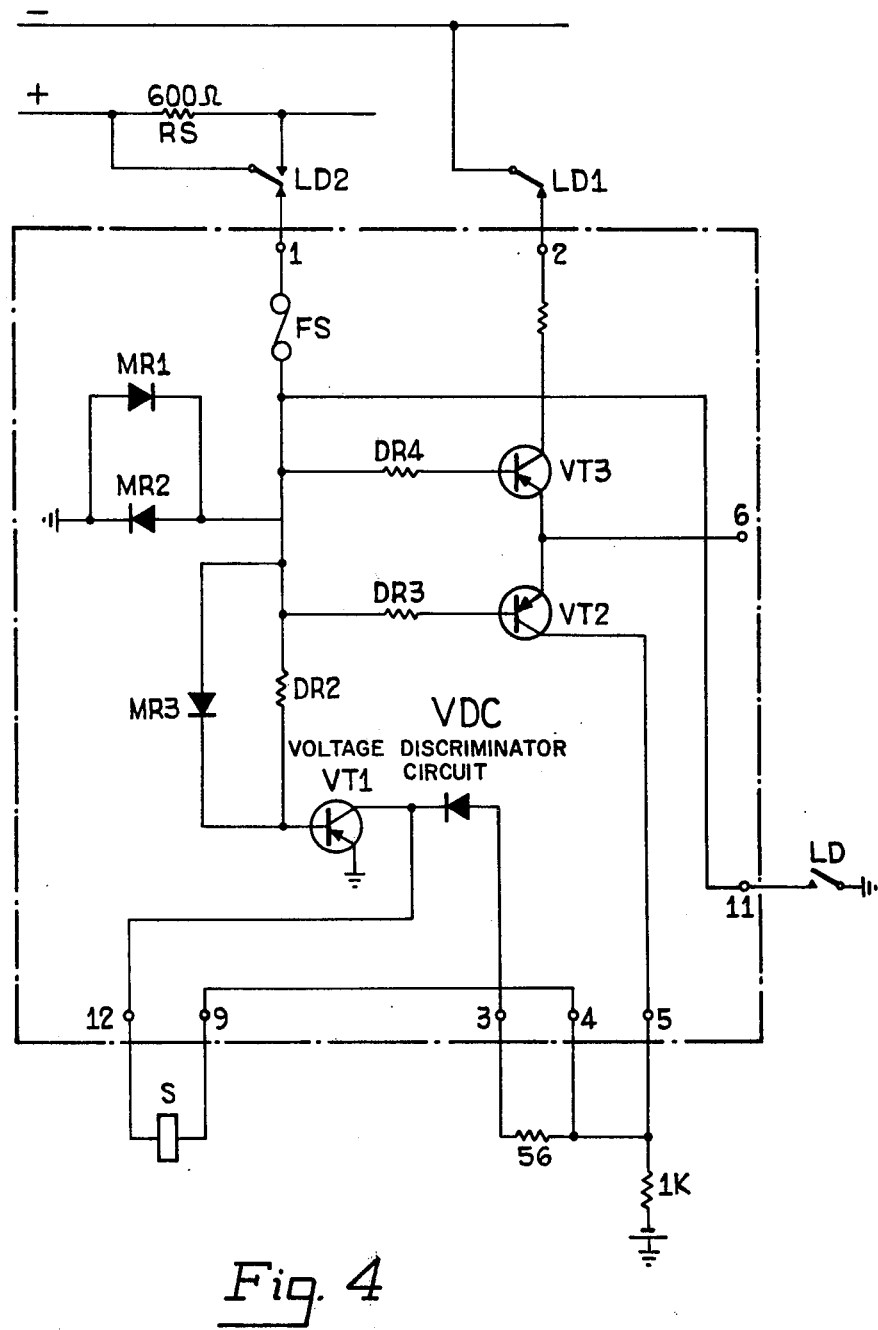
FIG. 4 shows the circuit diagram of a voltage discriminator circuit.

When the alarm priming signal (33 K ohm resistor) is applied across the subscribers line, the line is applied to terminals 1 and 2 of the voltage discriminator circuit VDC by way of contacts LD1 and LD2 if relay LD is not currently operated to a P wire earth (i.e. the subscribers line circuit SLC is not currently in use). The 33 K ohm loop condition will be detected in the voltage discriminator circuit VDC causing relay S to operate. The voltage discriminator circuit VDC is shown in FIG. 4. The connection of a control signal to the subscribers line produces a voltage of 0.9 volts across the 600 ohm resistor R5 which is connected in series with the subscribers line. The 0.9 volts conditions is applied, by way of the fuse FS to the base circuit of transistors VT1, 2 and 3. Transistors VT2 and VT3 are biased off by a voltage exceeding 0.9 volts applied to terminal 6 and their emitters. Transistors VT1 however has its emitter earthed and as the control signal exceeds this value it conducts and the collector current of VT1 causes relay S to operate. The operation of relay S in FIG. 3 causes the subscribers line to be connected to earth and battery over contacts S1 and S2, the memory relay M to be operated at contacts S3 and the access seize lead AS to be disconnected at contacts S4. The operation of the memory relay M causes (i) the memory relay to lock to the earth on contacts LD3 at contacts M1, (ii) the subscribers line circuit SLC to be removed from the line monitor circuit at contacts M2, M3 and M4 and for the access seize lead to be prepared for the possible subsequent release of the S relay.

The line monitoring circuit remains in this state, with relays S and M operated and relay LD released, until the alarm priming condition is removed and replaced by either (i) an open circuit condition (i.e. alarm detection threshold circuits operated), (ii) a short circuit (line disable) or (iii) a polarised resistance condition (alarm reset).

When the line is looped a voltage of 7–15 volts appears across resistor R5 in FIG. 4 which is applied by way of fuse FS to the base circuits of transistors VT1, 2 and 3 which all conduct. Relay S however is prevented from operating by short circuit action due to transistor VT2 conducting. The collector current in transistor VT3 is used to assist in operating the line relay in the line circuit to compensate to the addition of the series resistor R5 when normal telephonic communication is required. If the line becomes open circuit the battery condition applied by contacts S2 operated and back by way of the 33 K ohm alarm priming condition is removed and transistor VT1 becomes cut off. Similarly the application of the alarm reset condition by the operation of key KR1 in FIG. 2 causes transistor VT1 in FIG. 4 to cut-off and relay S is again released.

Accordingly it can be seen that the removal of the alarm priming signal, for whatever reason, causes relay S to release. The release of relay S at contacts S1 and S2 disturbs the line voltage condition to ensure that relay S remains released and at contacts S4 causes an "access seize" signal to be generated on leads AS. It will be appreciated that relay M remains operated at this point locked to the LD3 earth by way of contacts M1.

Figure 5:
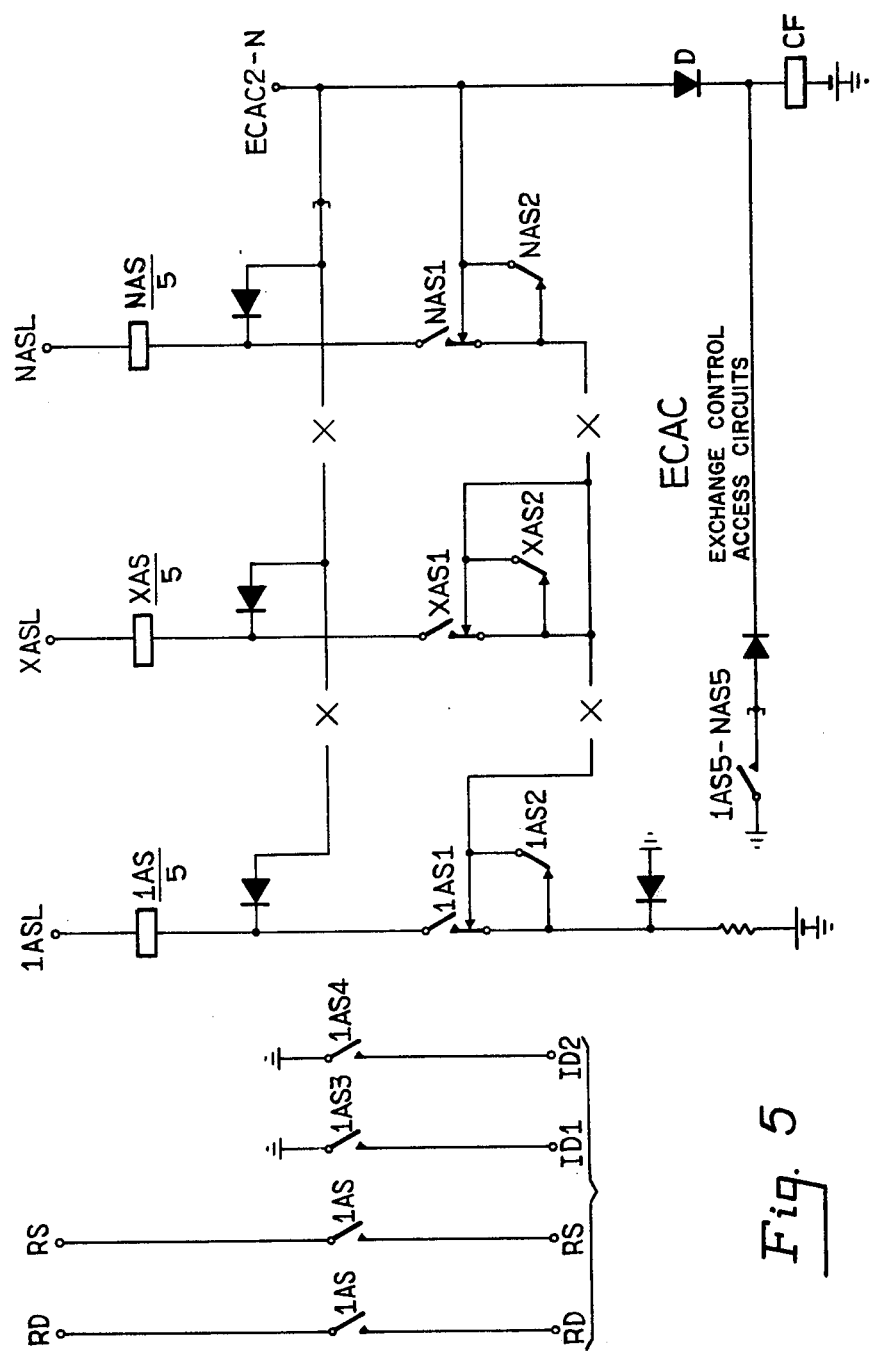

The application of the access seize condition on lead AS into the exchange control access circuit ECAC (FIG. 1) causes that circuit to identify the line experiencing the alarm priming condition change. FIG. 5 shows the details of the exchange control access circuit in which each line monitoring circuit served by an ECAC has an identity relay (AS1 to ASX to ASN) all connected in a priority chain. The operating of an identity relay (AS) causes the identity of the particular line monitoring circuit to be applied, on leads ID1 and ID2 into the exchange control and line identifier circuit EC & LIC (FIG. 1) which is shown in detail in FIG. 6. The operation of the relevant AS relay in FIG. 5 connects the RD and R5 leads from the relevant LMC into the exchange control and line identifier circuit. The RD lead is connected to a second voltage detector circuit VDCX (similar to VDC in FIG. 3) which is arranged to detect the application of an alarm reset (i.e. 33 K ohm polarised) condition to the subscribers line under consideration. If it is an alarm reset condition relay R5 will be operated in FIG. 6 which prevents relay ST from operating and over lead R5 through the exchange control access circuit ECAC causes relay LD to operate in the line monitoring circuit LMC (FIG. 3). The operation of relay LD in the line monitoring circuit causes relay M to release resetting the line monitoring circuit back to the reset state.

Figure 6:
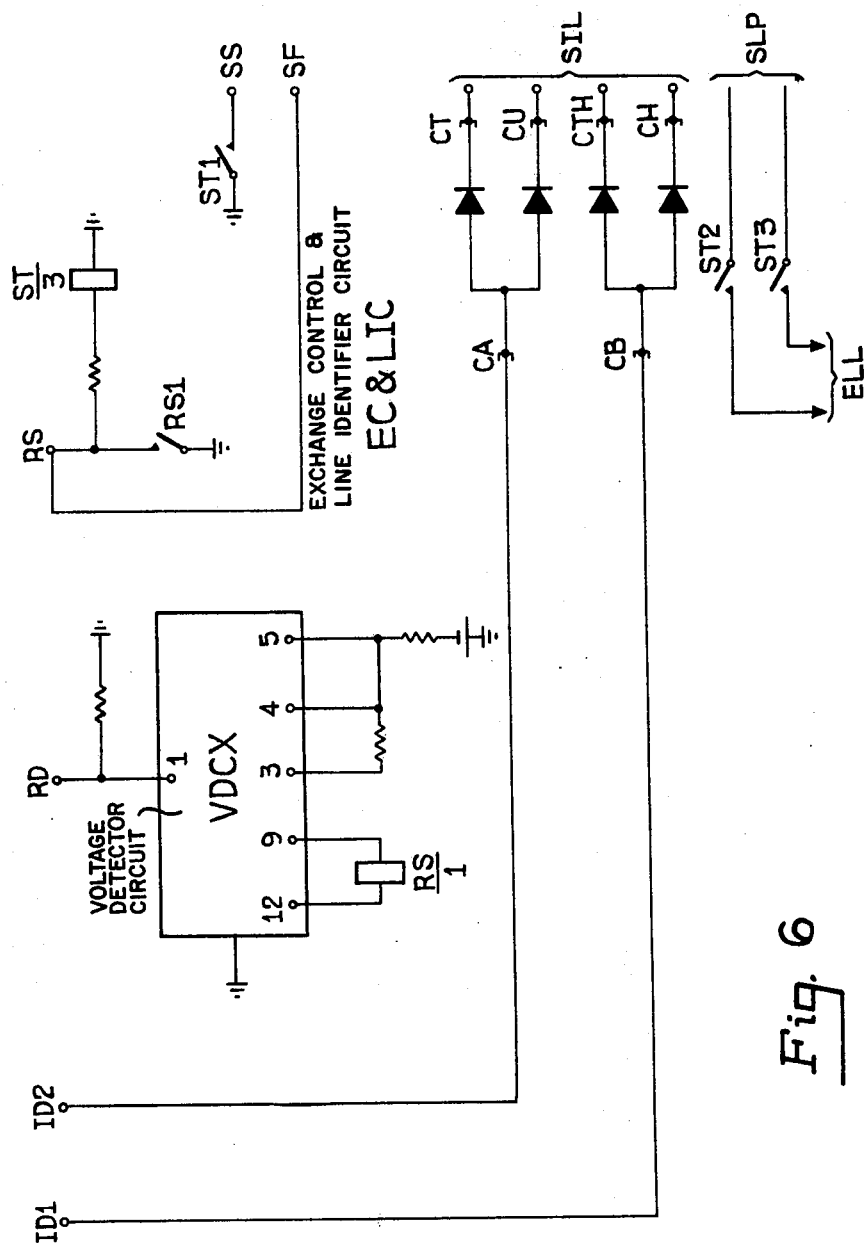
FIG. 6 shows a circuit diagram of the exchange control and line identification circuit.

Should the condition on the subscribers line not be a genuine alarm reset condition lead RD will be in a state which does not cause relay RS to operate. Relay ST in FIG. 6 is arranged to be of such a resistance value that relay LD in the particular line monitoring circuit does not operate but relay ST will itself operate slowly to the battery on that LD relay. The operation of the ST relay causes a start condition to be applied over leads SS into the MF sender (MFS FIG. 1) and the sender is conditioned over the diode field and leads SIL to send MF signals over lead SLP to the remote event recorder using leads ELL to cause the alarm condition to be signalled together with the identity of the line monitoring circuit responsible. In FIG. 6 point CA is common to all ID1 leads having the same thousands and hundred digits whereas point CB is common to all ID2 leads having the same tens and units digits.

It will be realised that use of the normal telephone instrument would cause the alarm to be activated if used once the alarm has been primed. This can be obviated by disconnecting the telephone instrument using contacts of the alarm priming and resetting keys.

The above embodiment relates to the application of the principles of the invention to alarm monitoring over relatively prolonged periods typically many hours and other uses fall within the same concepts. These are however exceptions which are generally confined to situations where someone requires to call for immediate assistance as in the cause of cashiers, old persons in distress etc., in these cases it will only be necessary for suitable switching arrangements to apply a 33 K ohm resistor across the line for say 50 milli-seconds in order for an alarm to be raised and this can be accomplished by non-locking switches activated by hand or foot by pull cords or any other means.

Another feature of the invention is the ability to convey different alarms, over the same line pair but not simultaneously. For example it would be possible to distinguish between a fire alarm and a process failure by arranging that one alarm condition caused a line disconnection whilst the other connected an earth to the 'B' line of the pair. In this event when the identification circuit is associated in its initial line checking procedure it is arranged to monitor for the earth on the 'B' leg and if evident cause the alarm classification coding to be appropriately modified.

It is evident from the above description that besides accomplishing the set functions the equipment also monitors against line deterioration since once the alarm is primed the line is under constant supervision.

What we claim is:

1. A remote alarm signalling system comprising protected premises and a telecommunications exchange, and further comprising:
   (i) at each protected premises, detector means for detecting the presence of an alarm condition and alarm signalling means responsive to the detector means and connected to a telecommunications line serving the protected premises and terminated on a telecommunications exchange, the alarm signalling means being arranged to apply to the telecommunications line a characteristic signal when the alarm detector is primed and to remove the characteristic signal from the line when the detector means detects the alarm condition and
   (ii) at the telecommunications exchange, for each telecommunications line having an alarm signalling means for providing an alarm connected to it, monitoring means connected to the line for detecting the application and removal of the characteristic signal, and a common alarm identification circuit connected to the monitoring means and taken into use by the monitoring means when said monitoring means detects that the characteristic signal has been removed from the line, and wherein the common alarm identification circuit is arranged to generate coded signals indicative of the identity of the alarm condition for display at an alarm monitoring equipment.

2. A remote alarm signalling system according to claim 1 in which the alarm monitoring equipment is located remotely from the exchange and is connected to the exchange by exclusive land line.

3. A remote alarm signalling system according to claim 2 in which the alarm monitoring equipment comprises a microprocessor controlled event recorder arranged to provide a human recognizable record of the identity of the alarm condition.

4. A remote alarm signalling system according to claim 1 in which the alarm signalling means includes a polarised resistor circuit arrangement adapted to be connected across the telecommunications line to generate the characteristic signal.

5. A remote alarm signalling system according to claim 4 in which the detector means includes a switching device activated by the alarm condition and adapted to remove the polarised resistor arrangement from the telecommunications line.

6. A remote alarm signalling system according to any one of claims 4 or 5, wherein the alarm signalling means include a reset arrangement adapted when actuated to reverse the polarisation of the characteristic signal, and wherein the alarm identification circuit arrangement includes means for detecting the reversal of the polarity of the characteristic signal.

7. A remote alarm signalling system according to claim 6 in which the alarm identification circuit arrangement upon detection of the reversed polarisation of the characteristic signal causes the monitoring means for the particular telecommunications line to be reset.

8. A remote alarm signalling system according to claim 7 in which the detector means includes a visual indicator adapted to be activated when the monitoring means associated with the particular telecommunications line is reset and the reset arrangement is actuated.

9. A remote alarm signalling system according to claim 8 in which the visual indicator comprises a light emitting diode.

10. A remote alarm signalling system according to claim 8 in which the reset arrangement includes a manually operable key switch.

11. A remote alarm signalling system according to claim 10 in which the characteristic signal is applied to the telecommunications line by way of a manually operable key switch.

12. A remote alarm signalling system according to claim 11 in which the characteristic alarm signal is applied to the telecommunications line momentarily in response to the detection of an alarm condition regardless of the state of the telecommunication line.

* * * * *